3,047,640
PRODUCTION OF FLUOROPROPENE
Richard F. Sweeney, Randolph Township, Morris County, and Cyril Woolf, Morristown, N.J., assignors to Allied Chemical Corporation, New York, N.Y., a corporation of New York
No Drawing. Filed Mar. 22, 1960, Ser. No. 16,630
7 Claims. (Cl. 260—653.4)

This invention relates to processes for manufacture principally of hexafluoropropene, $CF_3CF=CF_2$, B.P. minus 29° C. by direct allylic fluorination of 3-chloropentafluoropropene-1, $CF_2ClCF=CF_2$, B.P. 7.5° C. Hexafluoropropene is an important synthetic rubber constituent monomer.

Prior art attempts to form hexafluoropropene by direct allylic fluorination of 3-chloropentafluoropropene-1 have been unsuccessful from practical viewpoint. According to one proposal in which 3-chloropentafluoropropene-1 was fluorinated by means of antimony trifluoride, no worthwhile formation of hexafluoropropene was accomplished because an allylic rearrangement took place giving high yield of $CF_3CF=CFCl$ instead of the sought-for hexafluoropropene. In another instance, it has been proposed to make hexafluoropropene by procedure embodying reaction of 3-chloropentafluoropropene-1 with alkali metal fluorides, e.g., $KF.2H_2O$, in the presence of a water-soluble solvent such as methyl alcohol. Yield of hexafluoropropene was low, of the order of 10% or so. Methods such as the foregoing obviously afford no commercial potentialities.

A major object of the present invention lies in the provision of a solid catalyst, a gas-phase method of making hexafluoropropene by direct allylic HF fluorination of 3-chloropentafluoropropene-1 by procedure which effects production of hexafluoropropene in good yields and which can be readily regulated to minimize allylic rearrangement of the 3-chloropentafluoropropene-1 starting material.

In accordance with the invention, it has been found that activated carbon of itself possesses the properties of promoting reaction of 3-chloropentafluoropropene-1 and anhydrous HF by an easily controllable, all gas-phase, catalytic process by which hexafluoropropene may be obtained in good yields. The invention also includes discovery of a reaction temperature range which functions conjunctively with the catalytic properties of activated carbon to accomplish the principal invention objectives, namely, allylic fluorination and, if desired, minimize allylic rearrangement. Moreover, it has been found that, with regard to best hexafluoropropene yields, reaction temperatures required are notably low.

Practice of the invention includes effecting reaction between gaseous 3-chloropentafluoropropene-1 and gaseous substantially anhydrous HF at moderately elevated reaction temperatures, preferably at substantially atmospheric pressure, and while in the presence of activated carbon catalyst, and recovering from the resulting reaction products hexafluoropropene and any of the reaction by-products desired. More particularly, gaseous 3-chloropentafluoropropene-1 and gaseous anhydrous HF are continuously metered, mixed and fed at substantially atmospheric pressure into a tubular reactor which is packed preferably full with activated carbon catalyst and which may be made of inert material such as nickel, Monel, or Inconel or steel lined with graphite or alundum, and enveloped in a suitable tubular electric furnace provided with automatic heating means for reaction zone temperature maintenance. Product recovery may be effected more or less conventionally as in this art. For example, reaction zone exit may be passed thru a water scrubber to remove HCl, and the exit of the scrubber may be dried and then totally condensed in the receiver by suitable cooling, such as by use of a Dry Ice-acetone mixture. The resulting condensate then may be fractionally distilled in suitable equipment to facilitate recovery of sought-for products, and separation of unreacted starting material which may be recycled if desired.

The activated carbon catalysts which may be used in practice of the invention are granular materials readily available from several commercial sources, suitable materials being various grades of around 8–14 mesh activated carbon such as Columbia 6G, Columbia SW, and Darco. Granular size of the activated carbon employed is not highly critical. Ordinarily, reaction is carried out in elongated tubular reactors, and in these instances it is desirable to employ activated carbon granules of average mesh size between 1/20 and 1/4 of the reactor diameter, and better conditions are those in which a reactor is substantially completely filled with granules of average mesh size of about 1/8 or 1/10 of the diameter dimension of the reactor.

In accordance with the invention is has been found that when 3-chloropentafluoropropene-1 and substantially anhydrous hydrogen fluoride are brought together in the presence of a catalyst preferably consisting of activated carbon, allylic fluorination of 3-chloropentafluoropropene-1 to hexafluoropropene is effected over a fairly broad temperature range from any reasonably elevated reactive temperature up to not in excess of about 450° C. Significant allylic fluorination is brought about throughout the indicated temperature range which for practical purposes may be considered as substantially in the range of 150–450° C.

Temperature appears to be a major controlling factor with regard to regulating the course of the reaction and controlling the relative quantities of various reaction products obtained. Major reaction may be summarized as

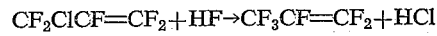
$$CF_2ClCF=CF_2 + HF \rightarrow CF_3CF=CF_2 + HCl$$

In general, lower temperatures cause maximum allylic fluorination, whereas higher temperatures, while effective to produce significant yields of hexafluoropropene, are conducive to some allylic rearrangement resulting in formation of some $CF_3CF=CFCl$, B.P. 8.4° C., and formation of some 1,1,1,2,3,3,3-heptafluoropropane,

$$CF_3CHFCF_3$$

B.P. minus 17–18.5° C. which, in some overall systems of plant operation, may be a desirable by-product. This material is useful as a propellant or as a gaseous dielectric. It has been found that where production of hexafluoropropene is the major objective, reaction zone temperatures should be held at not more than about 275° C., and where maximum yields of hexafluoropropene are desired, along with minimum allylic rearrangement of $CF_2ClCF=CF_2$ and formation of 1,1,1,2,3,3,3-heptafluoropropane, reaction zone temperatures should be held substantially in the range of 175–250° C.

To some substantial extent mol ratios of HF to 3-chloropentafluoropropene-1 starting material are correlated to both reaction temperatures and the compositions of whatever sought-for products are desired. Throughout the broad temperature range indicated, generally, the quantity of HF utilized relative to 3-chloropentafluoropropene-1 starting material may be any amount sufficient to react with a substantial quantity of hexafluoropropene, and if starting material conversion and HF utilization per pass are not of major importance, HF in amount less than theoretical, i.e. less than one mol per mol of $CF_2ClCF=CF_2$ may be employed. Use of less than one molecular equivalent of HF is not preferred, and considering the overall temperature range of substantially 150–450° C., mol ratio of HF to 3-chloropentafluoropropene-1 should be substantially in the range of 1:1 to 4:1. When the operational objective is production of hexafluoropropene as the primary sought-for product, mol ratio of HF to 3-chloropentafluoropropene-1 is usually substantially in the range of 1:1 to 3:1, and if the heptafluoropropane is desired as the dominant product, mol ratio should be preferably in the range of 2:1 to 4:1. In circumstances of best operation where maximum allylic fluorination is desired along with minimum allylic rearrangement and minimization of formation of the heptafluoropropane, preferred mol ratios of HF to 3-chloropentafluoropropene-1 starting material are substantially in the range of 1.5:1 to 3:1.

While pressures above and below atmospheric may be employed, an important advantage afforded by the invention is that the reaction may be carried out efficiently at substantially atmospheric pressure. It will be understood that in the practice of gas-phase catalytic processes of the general type described herein, i.e. processes in which a gas stream is flowed successively thru reaction and product recovery systems, for all practical purposes, as relate to reactions themselves, pressure is considered as being substantially atmospheric. Technically, however, pressures in such systems are sufficiently on the positive side to effect commercially satisfactory gas flow thru the apparatus train. Thus, strictly speaking, depending upon factors such as apparatus design, mesh size of catalyst, unpacked gas space in the reactor, desired contact time, etc. actual pressures in systems of the kind under consideration may vary from 2 up to say 10–15 pounds gauge, and accordingly operations of this type are included in the designation of substantially atmospheric pressure.

Contact time may be varied considerably without noticeable disadvantage to high process efficiency. Generally, increasing contact time and reactor temperature results in higher HF utilization and conversion of 3-chloropentafluoropropene-1, and the lowering of contact time and reactor temperature results in lower HF utilization and organic conversion. Contact times may lie in the range of 0.5–150 seconds, and more usually and preferably in the range of 1–25 seconds. To a substantial extent, contact time, reactor temperature and ratio of reactants are interrelated, and depending upon apparatus and the particular operation at hand, optimum conditions as to contact time may be determined by test runs.

In following Example 1, the reactor consisted of a 1″ I.D. 42″ long nickel tube heated externally by an electric furnace enveloping about 30″ of the length of the reactor tube. In Examples 2 and 3, the reactor was a similar 1″ I.D. 36″ long nickel tube heated for about 30″ of the length. The reactors were provided at the inlet ends with suitable means for metered introduction of gaseous 3-chloropentafluoropropene-1 and anhydrous HF, while the reactor outlets were connected to the inlet ends of a products recovery train. The catalyst employed throughout was activated carbon (commercially available Columbia 6G grade) of 8–14 mesh, size being such as to provide granules averaging about 1/10 of the diameter of the reactors. The reactors were completely filled with catalyst, total volume in the reactor of Example 1 amounting to about 0.54 liter, and in Examples 2 and 3 volume of catalyst amounted to about 0.47 liter. Pressure in the reactor systems was about 2 lbs. per sq. in. gauge, i.e. sufficient to move the gas stream thru the systems at contact times indicated and thru the remainder of the apparatus train. Percentages noted are by weight.

*Example 1.*—During a period of about 2¾ hrs., about 82 grams (4.10 mols) of anhydrous HF and about 429 g. (2.58 mols) of 3-chloropentafluoropropene-1 were premixed and metered into the reactor system. Mol ratio of HF to organic starting material was about 1.6:1. Throughout the run temperature within the reactor was maintained in the range of about 194 to 201° C. Overall contact time was approximately 15 seconds. Products exiting the reactor were water-scrubbed to remove HCl and HF, dried by passage thru a $CaCl_2$ drying tower, and condensed and collected in a Dry Ice-acetone cooled receiver. About 49.0 g. (2.45 mols) of HF were scrubbed out of the reactor exit gas. A total of about 421 g. of material was condensed and recovered in the receiver. On fractional distillation, the following materials were isolated and by analysis, including infrared absorption spectrum and gas chromatography, were established to be: 135 g. (0.9 mol) of hexafluoropropene, $CF_3CF=CF_2$, B.P. minus 29° C.; 15 g. (0.088 mol) of 1,1,1,2,3,3,3-heptafluoropropane, $CF_3CHFCF_3$, B.P. minus 17–18.5° C.; 131 g. (0.787 mol) of $C_3F_5Cl$ which consisted of about 95% by weight of 3-chloropentafluoropropene-1 starting material and about 5% 1-chloropentafluoropropene, $CF_3CF=CClF$, B.P. 8° C.; and 19 g. (0.102 mol) of 1-chloro-1,1,2,3,3,3-hexafluoropropane, $$CF_3CFHCF_2Cl$$

B.P. 16° C. There were recovered also about 121 g. of material having a boiling point of about 52–53° C. corresponding to a compound of the empirical formula $C_3HCl_2F_5$. No detectable amount of $CF_3CClFCF_3$ was formed.  Conversion of 3-chloropentafluoropropene-1 to hexafluoropropene was about 35%, and yield of the sought-for hexafluoropropene product, based on the 3-chloropentafluoropropene-1 starting material reacted, was about 49%.

*Example 2.*—During a period of about 4 hours, about 170 g. (8.50 mols) of anhydrous HF and about 555 g. (3.33 mols) of 3-chloropentafluoropropene-1 were premixed and metered into the reactor system. Mol ratio of HF to organic starting material was about 2.6:1. Throughout the run temperature within the reactor was maintained in the range of about 204 to 220° C. Overall contact time was approximately 12 seconds. Exist of the reactor was handled as in Example 1. A total of about 500 g. condensate was recovered from the Dry Ice trap. On fractional distillation, the following materials were isolated and by analysis, as above, were established to be: about 132 g. (0.88 mol) of hexafluoropropene; 11 g. (0.065 mol) of 1,1,1,2,3,3,3-heptafluoropropane; 169 g. (1.02 mols) of $C_3F_5Cl$ which consisted of approximately 90% by weight of 3-chloropentafluoropropene-1 starting material and about 10% 1-chloropentafluoropropene; and 52 g. (0.279 mol) of 1-chloro-1,1,2,3,3,3-hexafluoropropane. In addition, about 102 g. (0.502 mol) of material boiling at about 52–53° C. and corresponding to a compound of the empirical formula $C_3HCl_2F_5$ were obtained. No detectable amount of $CF_3CFClCF_3$ was formed. Conversion of 3-chloropentafluoropropene-1 to hexafluoro propene was about 26%, and yield of hexafluoropropene, based on the 3-chloropentafluoropropene-1 starting material reacted, was about 37%.

*Example 3.*—During a period of about 6.5 hrs., about 230 g. (11.5 mols) of anhydrous HF and about 575 g. (3.45 mols) of 3-chloropentafluoropropene-1 were premixed and metered into the reactor. Proportioning of reactants was such that mol ratio of HF to organic was about 3.33:1. Throughout the run temperature in the reactor was maintained approximately in the range of 400 to 406° C. Overall contact time was approximately 11 seconds. Exit of the reactor was handled as in Examples 1 and 2. A total of about 355 g. of condensate was recovered in the trap. On distillation, the following materials were isolated and by analysis, as above, were established to be: about 27 g. (0.18 mol) of hexafluoropropene; 157 g. (0.924 mol) of 1,1,1,2,3,3,3-heptafluoropropane; and about 154 g. (0.925 mol) of $C_3F_5Cl$ consisting of approximately 90% by weight of 1-chloropentafluoropropene and about 10% 3-chloropentafluoropropene-1. No detectable amount of $CF_3CFClCF_3$ was formed.

Conversion of 3-chloropentafluoropropene-1 to 1,1,1,2,3,3-heptafluoropropane was about 27%, and yield of 1,1,1,2,3,3,3-heptafluoropropane, based on the 3-chloropentafluoropropene-1 reacted, was about 28%.

We claim:

1. The process which comprises subjecting gaseous 3-chloropentafluoropropene-1 to the action of gaseous substantially anhydrous HF, in amount sufficient to react with a substantial quantity of said 3-chloropentafluoropropene-1, at elevated reactive temperature not in excess of about 450° C., and while in the presence of activated carbon catalyst, and recovering from the resulting reaction product material of the group consisting of hexafluoropropene and 1,1,1,2,3,3,3-heptafluoropropane.

2. The process of claim 1 in which temperature is substantially in the range of 150–450° C.

3. The process of claim 1 in which mol ratio of HF to 3-chloropentafluoropropene-1 is substantially in the range of 1:1–4:1.

4. The process for making hexafluoropropene which comprises subjecting gaseous 3-chloropentafluoropropene-1 to the action of gaseous substantially anhydrous HF, in amount sufficient to react with a substantial quantity of said 3-chloropentafluoropropene-1, at elevated reactive temperature not in excess of about 275° C., and while in the presence of activated carbon catalyst, and recovering hexafluoropropene from the resulting reaction product.

5. The process of claim 4 in which temperature is substantially in the range of 150–275° C.

6. The process of claim 4 in which mol ratio of HF to 3-chloropentafluoropropene-1 is substantially in the range of 1:1 to 3:1.

7. The process for making hexafluoropropene which comprises subjecting gaseous 3-chloropentafluoropropene-1 to the action of gaseous substantially anhydrous HF in amount to provide an HF to 3-chloropentafluoropropene-1 mol ratio substantially in the range of 1.5:1 to 3:1 at temperature substantially in the range of 175–250° C., and while in the presence of activated carbon catalyst, and recovering hexafluoropropene from the resulting reaction product.

References Cited in the file of this patent

UNITED STATES PATENTS 2,005,706  Daudt et al. _____ June 18, 1935